(12) United States Patent
Auflick et al.

(10) Patent No.: US 6,820,238 B1
(45) Date of Patent: Nov. 16, 2004

(54) ROTARY CONTROL FOR QUICK PLAYLIST NAVIGATION IN A VEHICULAR MULTIMEDIA PLAYER

(75) Inventors: Jack L. Auflick, Westland, MI (US); David S. Cheney, White Lake, MI (US); Michael R. Remenak, Southgate, MI (US); Gregory R. Hamel, Livonia, MI (US); Robert H. Benedict, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 501 days.

(21) Appl. No.: 10/078,615

(22) Filed: Feb. 19, 2002

(51) Int. Cl.[7] ................................................. G06F 13/00

(52) U.S. Cl. ........................................ 715/723; 715/716

(58) Field of Search ................................ 345/716, 723, 345/764; 725/25, 28

(56) References Cited

U.S. PATENT DOCUMENTS

| | | | |
|---|---|---|---|
| 5,438,172 A | | 8/1995 | Fowler et al. |
| 5,457,669 A | | 10/1995 | Kim et al. |
| 5,570,340 A | * | 10/1996 | Lee et al. ................ 369/47.31 |
| 5,890,910 A | | 4/1999 | Tsurumi et al. |
| 6,023,706 A | | 2/2000 | Schmuck et al. |
| 6,122,646 A | | 9/2000 | Igarashi et al. |
| 6,247,130 B1 | | 6/2001 | Fritsch |
| 6,248,946 B1 | * | 6/2001 | Dwek ........................... 84/609 |

* cited by examiner

Primary Examiner—Cao (Kevin) Nguyen
(74) Attorney, Agent, or Firm—MacMillan, Sobanski & Todd LLC; Mark L. Mollon

(57) ABSTRACT

A multimedia player having a limited user interface achieves quick and easy navigation within a large playlist of stored digital audio files by employing the rotary volume control knob in a separate mode to advance or rollback sequentially through the playlist. Thus, an MP3 player can be implemented for an automotive or vehicular multimedia player without increasing the number of user control elements, such as buttons, knobs, or other switches.

17 Claims, 5 Drawing Sheets

ROTARY CONTROL FOR QUICK PLAYLIST NAVIGATION IN A VEHICULAR MULTIMEDIA PLAYER

CROSS REFERENCE TO RELATED APPLICATIONS

This application is related to co-pending U.S. application Ser. No. (V201-0522), entitled "Fast Seek Between Multiple Selections in a Multimedia Player", and to co-pending U.S. application Ser. No. (V201-0924), entitled "Track Access Management for Large Playlists in a Vehicular Multimedia Player."

STATEMENT REGARDING FEDERALLY SPONSORED RESEARCH

Not Applicable.

BACKGROUND OF THE INVENTION

The present invent on relates in general to multimedia entertainment systems, and, more specifically, to an audio multimedia player for quickly navigating between track selections contained within large playlists.

With the emergence of techniques such as MP3 for compressing digital audio files, the number of track selections (e.g., songs) stored on a single medium (e.g., a compact disc, a hard disk drive, or a flash memory card) can become very large. For example, a compact disc (CD) with a capacity of 650 megabytes can store more than 10 hours of recorded music in many hundreds of separate MP3-encoded files. The MP3 format is formally called MPEG-1 layer 3, which was adopted by the Moving Picture Experts Group jointly operated by the International Standards Organization (ISO) and the International Electro-Technical Commission (IEC). A digital audio file with this encoding has a file extension of "mp3". Many users are compiling extensive libraries of MP3 material for playing from their computers and from dedicated multimedia players.

Other compression technologies are also known, such as AAC, which allow many individual digital audio tracks to be stored in the same individual unit of media. Furthermore, storage capacity of various media types (such as hard disk drives) are increasing to the point where large numbers of uncompressed files can be stored and simultaneously accessible to a player.

Media players for such digital audio media must provide ways in which the user of the media player can navigate to (i.e., choose) a desired selection for reproduction. In mobile applications, such as a personal handheld unit or an automotive entertainment system, the number of user controls and/or display sizes may be limited. Due to the large number of selections that may be in a particular playlist (i.e., a grouping of audio selections active within a player), the user must be able to rapidly move within the playlist. However, ways have been lacking for fast, simple, and efficient navigation among selections using an uncomplicated interface (e.g., a small number of push buttons and a display having few character spaces).

Conventional automotive multimedia players typically include simple interfaces to facilitate use by vehicle operators Audio sources have included AM and FM radio, audio cassette apes, and CD-Audio discs. Navigating between sources and then between individual selections (e.g., tuning between radio stations, fast forwarding or rewinding a tape, or switching between the small number of tracks on an audio CD) has been achieved using only a few control elements such as pushbuttons. Typical push buttons include tune-up, tune-down, seek-up, and seek-down. Navigating sequentially through a large playlist with only the functions of these push button can be tedious and slow.

SUMMARY OF THE INVENTION

The present invention has the advantage of providing quick and easy navigation through large playlists without introducing additional control elements to an automotive multimedia player.

In one aspect of the invention, a method is provided for navigating from a current selection to a desired selection within an ordered playlist of selections for reproduction by a vehicular multimedia player. Each selection in the ordered playlist has a corresponding selection number. The vehicular multimedia player has a rotary position encoder for controlling audio volume and a plurality of push button controls. The rotary position encoder is initially-maintained in a volume adjust mode. A respective selection number of the current selection is displayed on a display. One of the push button controls is activated and the rotary position encoder is switched to a track access mode in response thereto. Rotation of the rotary position encoder is detected in either a clockwise direction or a counterclockwise direction. Respective selection numbers are displayed for interim selections on the display according to the detected rotation, wherein the interim selection is recurrently advanced in response to successive rotation in the clockwise direction over a predetermined resolution angle and is recurrently rolled back in response to rotation in the counterclockwise direction over the predetermined resolution angle. An absence of rotation of the rotary position encoder lasting for a first predetermined time is detected, wherein an interim selection having its selection number displayed after the first predetermined time comprises a chosen selection. The chosen selection is reproduced.

DETAILED DESCRIPTION OF PREFERRED EMBODIMENTS

Figure 1:
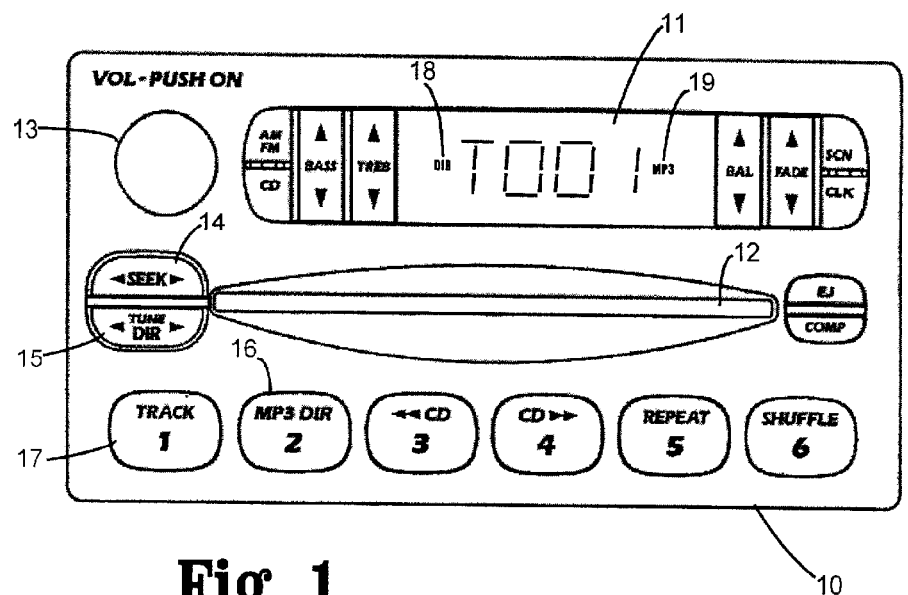
FIG. 1 is a front, plan view of a multimedia player of the present invention.

Referring now to FIG. 1, a media player 10 may comprise a multimedia AM/FM/CD/CDDJ/MP3 player for installation in an automotive instrument panel, for example. A control panel of media player 10 includes a multi-character, segmented display 11 having character segments for displaying selection identifying data (e.g., track number, file name, etc.). Display 11 also contains special icons for illumination during specific conditions (e.g., an "MP3" icon 19 to indicate that an MP3 media is being played and a "DIR" icon 18 to illuminate when the player is in a directory mode, as explained later).

A slot 12 receives a CD-ROM compact disc having digital audio files (e.g., MP3 files) stored thereon. Preferably, slot 12 also accepts standard CD-Audio discs for reproduction of CD tracks. A remote disc jockey (CDDJ) may also be controlled by media player 10, and CD-ROM discs containing MP3 files may be loaded into and reproduced from the CDDJ located remotely from the control panel.

The control panel of media player 10 includes a combination rotary/push button switch 13 for turning the unit on and off and for adjusting the playing volume. The user control interface also includes other push buttons including a seek rocker switch 14, a tune rocker switch 15, a preset/directory button 16, and a preset/track mode button 17. Seek rocker switch 14 produces a seek-down command when its left end is pressed and a seek-up command when its right end is pressed. Directory rocker switch 14 produces a previous-directory command when its left end is pressed and a next-directory command when its right end is pressed. Push button 16 toggles between a flat-file mode and a directory mode as described below. Push button 17 initiates and cancels the track access mode of the invention.

Figure 2:
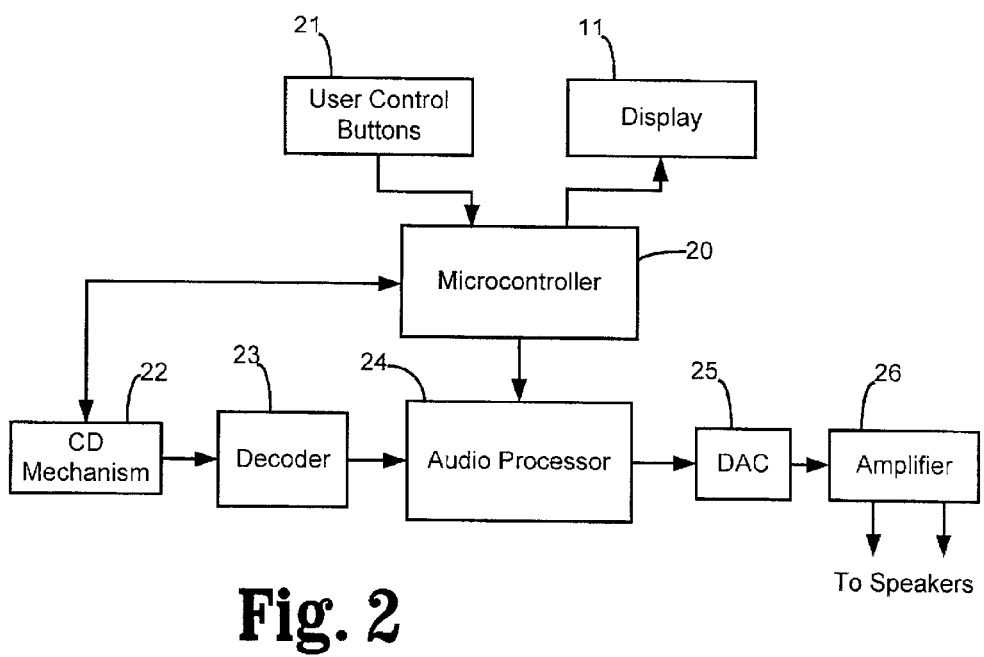
FIG. 2 is a block diagram showing main components of the multimedia player of FIG. 1.

FIG. 2 shows some of the functional components of media player 10. A microcontroller 20 coordinates the media player operation. Microcontroller 20 implements a human-machine interface together with display 11 and user control buttons 21 (including switches 13–17). A CD mechanism 22 includes disc transport, laser pick-up, data detection and formatting, error checking, and other functions. Digital data from compressed audio files are provided to a decoder 23 which decompresses the audio information and provides it to an audio processor 24. Other audio sources may also be included to provide additional audio signals to audio processor 24, such as AM and FM tuners and a CD-Audio output from CD mechanism 22 which bypasses decoder 23. Audio processor 24 performs commonized audio functions such as tone control and volume control, and may be comprised of a digital signal processor (DSP), for example. Processed digital audio signals are converted to analog signals in a digital-to-analog converter (DAC) 25. The analog audio signals are amplified in a power amplifier 26 and coupled to speakers (not shown) for audible reproduction.

Figure 3:
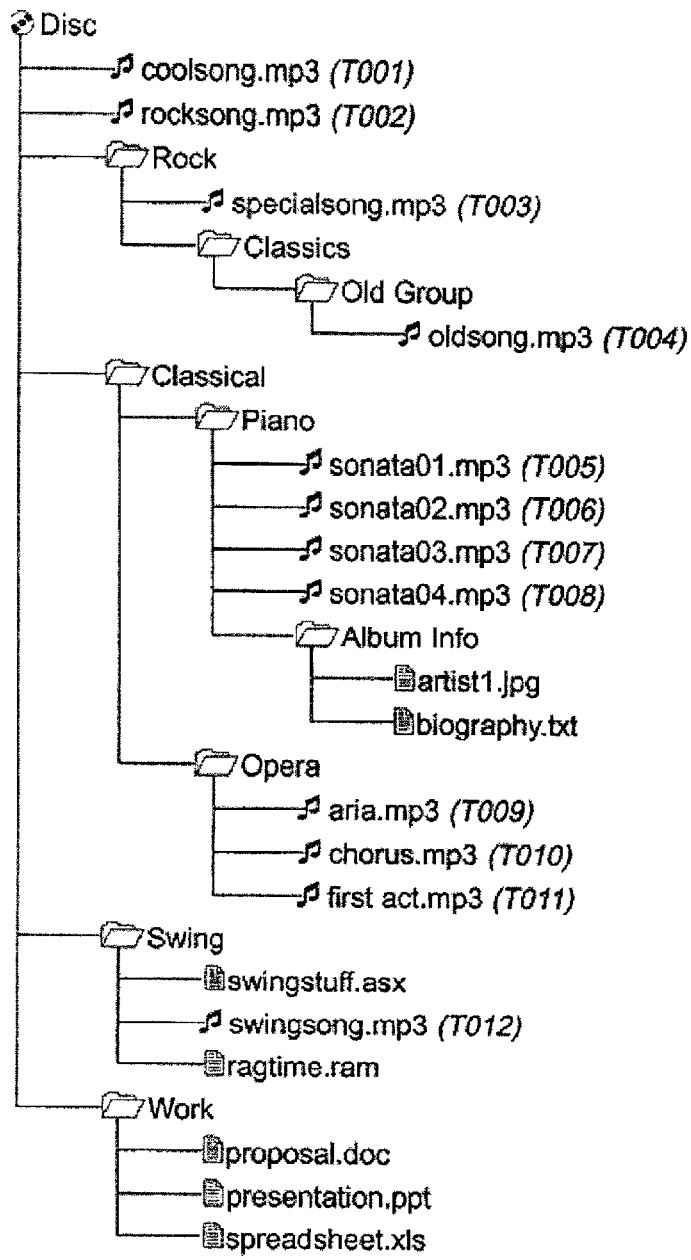
FIG. 3 shows an example of the contents of a compact disc and the selection number assignments in a flat-file mode of the multimedia player.
Figure 4:
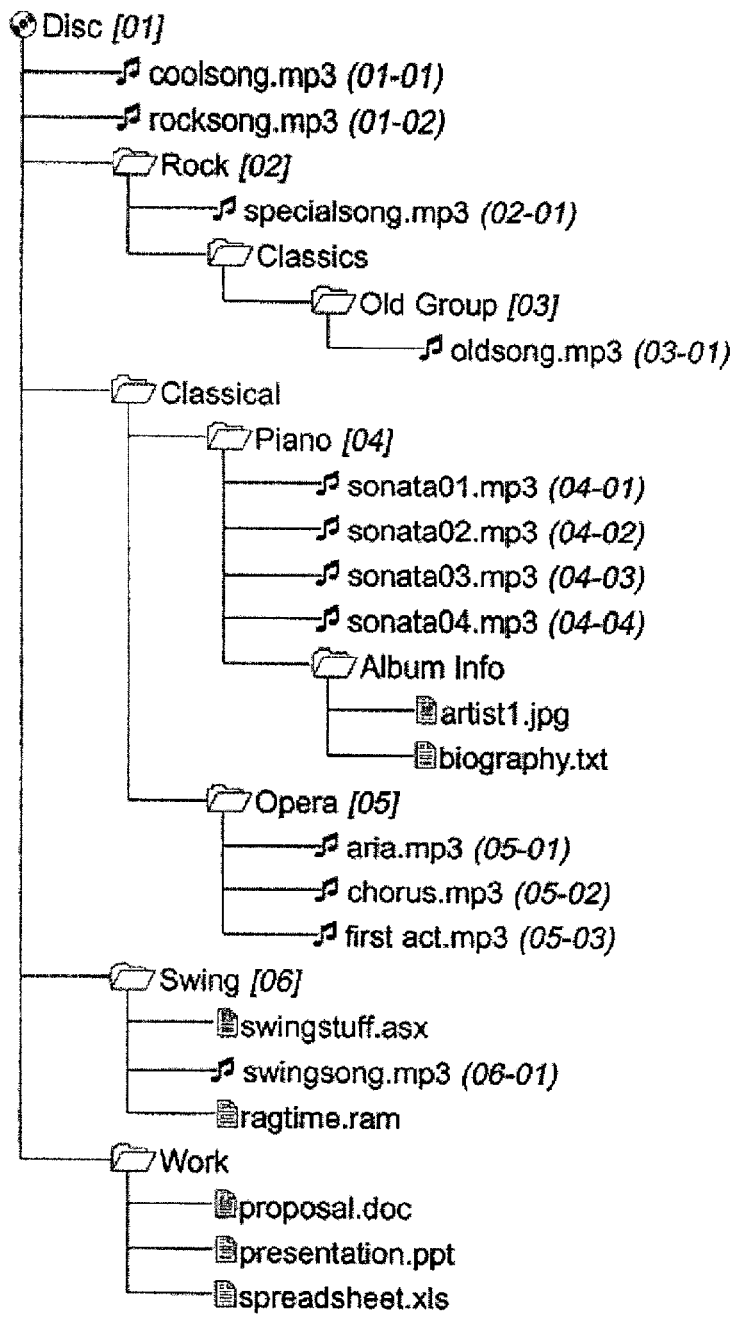
FIG. 4 shows the selection number assignments of the compact disc of FIG. 3 in a directory mode of the multimedia player.

The present invention provides direct access to selections (e.g., songs) within a playlist. The playlist may comprise any ordered (e.g., numbered) listing of files. FIGS. 3 and 4 show how an arbitrary collection of files on a storage media (e.g., a CD-ROM disc) with any directory or folder structure may be scanned by a media player and assembled into an ordered structure that can be navigated using the few characters available on display 11.

Each user created disc may contain playable target files for reproduction (e.g., MP3 files) within various directory structures and mixed with other non-playable types of files. FIGS. 3 and 4 show the contents of the same example disc organized by the player into a flat-file playlist structure and a single-level directory playlist structure, respectively. The example disc has two selections in its root directory: coolsong.mp3 and rocksong.mp3. There are four first level folders designated Rock, Classical, Swing, and Work. The folders contain target MP3 files and various subfolders, some of which contain other target MP3 files or additional subfolders.

Due to display and control limitations of the media player shown in FIG. 1, two alternative display modes are Preferably created in the preferred embodiment. As shown in FIG. 3, a flat-file mode assigns a number to each target file sequentially in a single list spanning the entire disc. In the display, each sequential file number is preceded by the letter "T" to indicate absolute track number. Thus, the MP3 files in FIG. 3 are associated with selection numbers T001 through T012.

As shown in FIG. 4, the directory mode assigns a number to each folder or subfolder (including the root directory) that contains a target file. Thus, the original folder structure is collapsed into a single-level structure of directories. Then within each directory, the target files are numbered sequentially, starting at one. The selection identifying data to be shown on the display includes the directory number followed by the selection number (e.g., 01— 01).

In order to manage access to the various tracks according to either the flat file mode or the directory mode, the microcontroller in a preferred embodiment scans the disc and creates an index table. Following the disc scanning operation, the flat-file selection numbers or the directory-mode selection numbers are shown on the display. When searching for another track, the user control buttons are manipulated in order to sequentially navigate between selection numbers within the currently active mode.

The present invention provides quick and easy navigation within a large playlist by employing the rotary volume control knob in a separate mode to advance or rollback sequentially through the playlist. A typical rotary position encoder used in existing automotive audio systems may have an angular resolution of about 15° (i.e., 24 detectable positions per full rotation of the knob). By using the rotation signals produced at this or even greater angular resolutions, the user can move through large sections of a playlist at a rate determined by the user.

Figure 5:
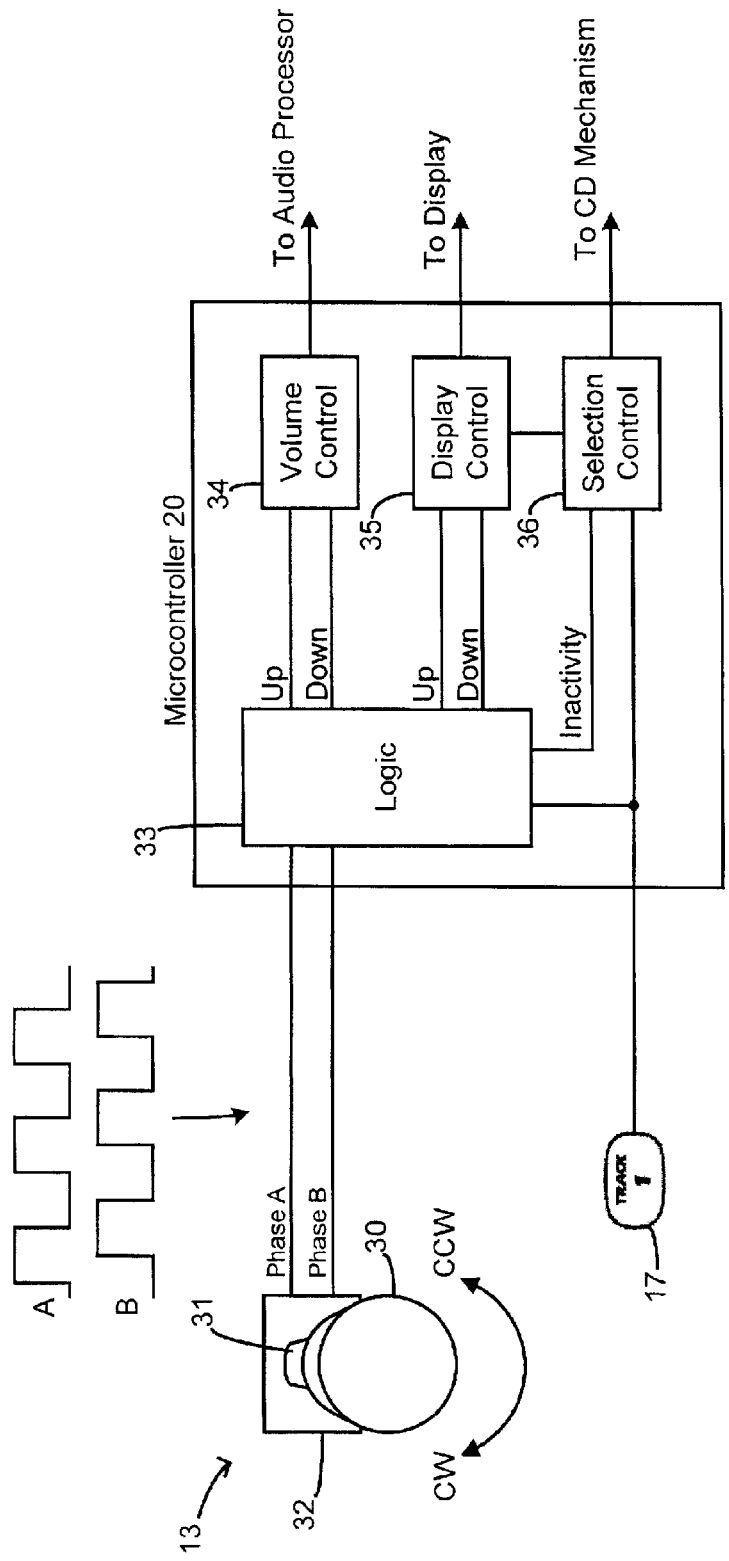
FIG. 5 is a block diagram showing a rotary position encoder in greater detail.

As shown in FIG. 5, switch 13 includes a knob 30 coupled by a shaft 31 to a body 32. Typically, sliding contacts within body 32 generate voltages on a pair of signal lines identified as Phase A and Phase B. The rotary encoder function of switch 13 can be provided by an ECW digital contacting encoder manufactured by Bourns, Inc., for example. A two-channel gray code (i.e., quadrature) signal is monitored by logic 33 contained in microcontroller 20 to detect rotation in either a clockwise (CW) direction or a counterclockwise (CCW) direction according to whether signal A or signal B has a leading phase.

When first powered up and during the majority of the time that the player is used, logic 33 operates in a volume adjust mode. Thus, when rotation signals are decoded into clockwise or counterclockwise rotations corresponding to the angular resolution of switch 13, logic 33 provides up or down volume-change commands to a volume control 34, respectively. An incremented or decremented gain control signal is then coupled to the audio processor.

When the player operates in an MP3-player mode, then push button 17 operates as a "track access mode" control button (also referred to herein as a "quick track" button). Push button 17 is coupled to logic 33 for providing a pulse signal when button 17 is pressed by the user. Pressing of button 17 switches the player into track access mode wherein rotation signals from the rotary encoder are decoded and applied by logic 33 to a display control 35 for navigating through the playlist (and having no effect upon the volume).

As knob 30 is turned clockwise through multiples of the angular resolution, a corresponding number of up or advance commands are provided from logic 33 to display control 35. Similarly, when knob 30 is turned counterclockwise through multiples of the angular resolution, a corresponding number of down or rollback commands are provided from logic 33 to display control 35. For example, the display is updated upon each rotation through 15° to show the next or previous selection number. Preferably, if in directory mode, then when the beginning or end of a directory is reached then the display changes to the previous or next directory. During the initial browsing through selection numbers, the currently playing track continues to play.

In one preferred embodiment, a new selection is retrieved and played when the user has stopped adjusting the rotary encoder for a first predetermined period of time (e.g., 2 seconds). The period of inactivity is detected by logic 33 and an inactivity signal is provided to a selection control 36 which obtains the interimly displayed selection number from display control 35 and signals the CD mechanism to retrieve the identified selection.

Figure 6:
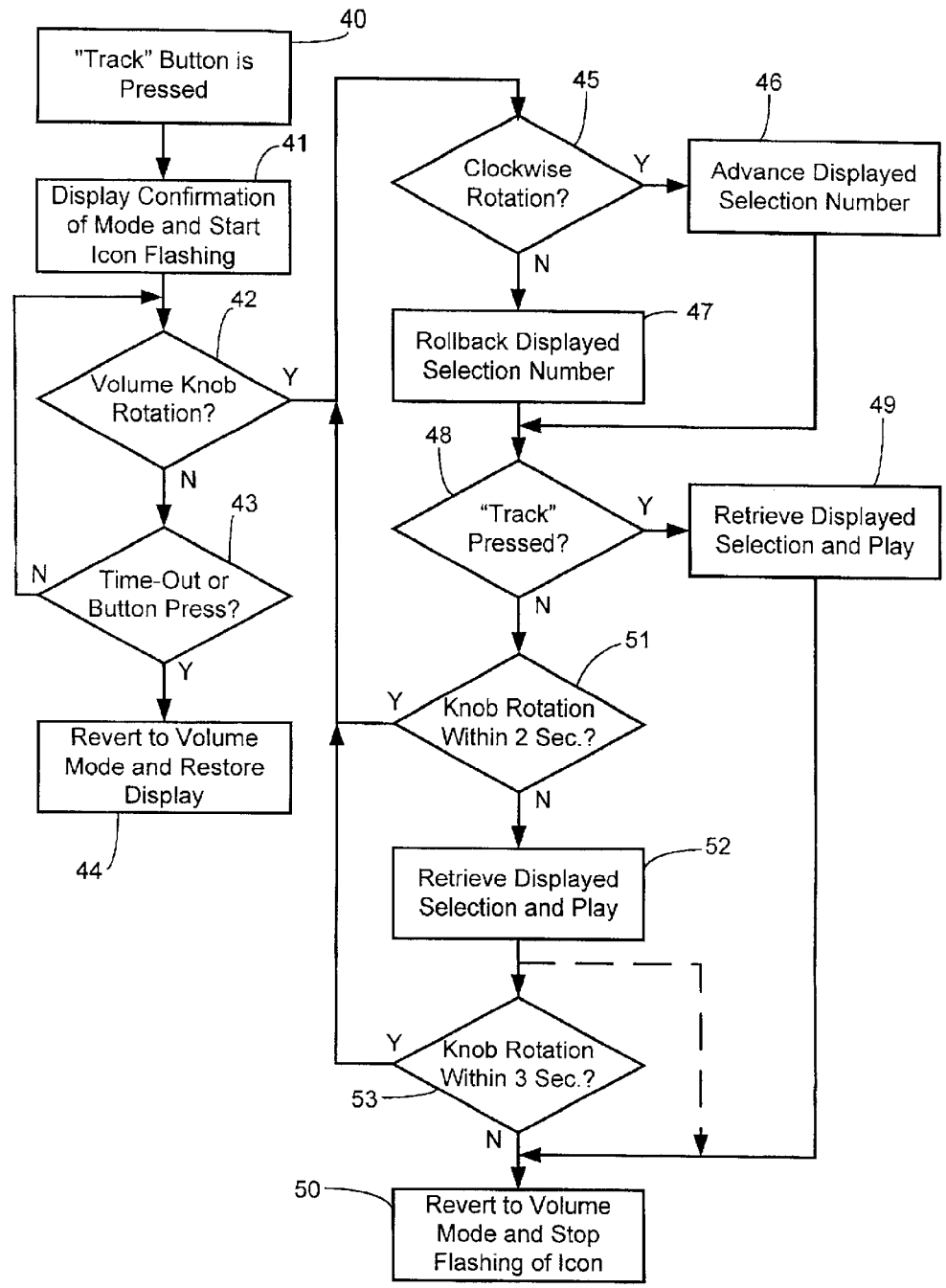
FIG. 6 is a flowchart showing a preferred embodiment of a track access mode of the rotary position encoder of the present invention.

A preferred operating method of the invention is shown in greater detail in FIG. 6. To initiate the feature of the present invention, the "Track" button is pressed in step 40. In user documentation or in the user interface, the feature may be designated with a particular label such as "Quick Track" or "Fast Track" or the like, or may simply be called the "Track" feature. In step 41, a mode confirmation message is shown on the display. For a four-character display, the letters "TRAC" may be displayed, for example. During track navigation, the characters of the display will instead be displaying track selection numbers. To provide an indication that the track access mode is active, the MP3 display icon (which indicates that the current audio source is MP3) is flashed at a steady rate.

While in track access mode, a check is made for rotation of the volume knob/rotary encoder in step 42. If no rotation is detected, then a check is made in step 43 to determine if a mode time-out period has been reached or if the Track button has been pressed. If not, then a return is made to step 42; otherwise, the player reverts to volume adjust mode and the display is restored to showing the currently reproduced track selection number. The time-out period may be about 2 seconds, for example.

When volume knob rotation is detected in step 42, then a check is made in step 45 to determine whether the rotation was clockwise or counterclockwise. If clockwise, then the interim selection number shown on the display is advanced by one selection. If the interim selection number already being displayed is the last selection while in flat file mode, then the interim selection wraps around to the first selection. If in directory mode and the last selection in a directory is already displayed, then the interim selection number is advanced to the first selection number in the next directory. From the last directory, the interim selection number wraps around to the first directory.

If rotation is counterclockwise, then the interim selection number shown on the display is rolled-back by one selection. If the interim selection number already being displayed is the first selection while in flat file mode, then the interim selection wraps around to the last selection number. If in directory mode and the first selection in a directory is already displayed, then the interim selection number is rolled-back to the last selection number in the previous directory. From the first directory, the interim selection number wraps around to the last directory.

So that the user can quickly exit the track access mode, a preferred embodiment includes a check in step 48 to detect whether the Track button is pressed. If it is pressed, then the displayed (interim) selection is retrieved and played in step 49. Immediately in step 50, the player reverts to the volume adjust mode and the flashing of the MP3 icon is ceased.

If the track button is not pressed in step 48, then the player stays in track access mode and monitors for further volume knob rotation for a first predetermined time (e.g., 2 seconds). This delay time allows the user to release the knob and reset their hand for further turning of the knob when they reach the end of their range of motion. When further rotation is detected then a return is made to step 45 to update the interim selection number in response to the direction of rotation.

If 2 seconds expires in step 51 with no further rotation of the volume knob, then it is assumed that the track adjustment is completed (i.e., it is not necessary for the user to press the Track button at the end of the adjustment). The displayed interim selection number is retrieved as the new current selection and it is reproduced in step 52.

In one embodiment, the track access mode may be exited as soon as the new selection is retrieved and played. Thus, a dashed line shows that after performing step 52, step 50 can be executed. In another embodiment, the user is allowed to audition the new current selection for a second predetermined time (e.g., 3 seconds) in step 53. This allows the user to verify that they stopped the track adjustment at their intended selection. If further adjustment is necessary, then it is not necessary to re-enter the track access mode if done within the first 3 seconds.

What is claimed is:

1. A method of navigating from a current selection to a desired selection within an ordered playlist of selections for reproduction by a multimedia player, each selection in said ordered playlist having a corresponding selection number, said multimedia player having a rotary position encoder for controlling audio volume and a plurality of push button controls, said method comprising the steps of:

maintaining said rotary position encoder in a volume adjust mode;

displaying a respective selection number of said current selection on a display;

activating one of said push button controls and switching to a track access mode of said rotary position encoder in response thereto;

detecting rotation of said rotary position encoder in either a clockwise direction or a counterclockwise direction;

displaying respective selection numbers for interim selections on said display according to said detected rotation, wherein said interim selection is recurrently advanced in response to successive rotation in said clockwise direction over a predetermined resolution angle and is recurrently rolled back in response to said rotation in said counterclockwise direction of said predetermined resolution angle;

detecting an absence of rotation of said rotary position encoder lasting for a first predetermined time, wherein an interim selection having its selection number being displayed after said first predetermined time comprises a chosen selection; and reproducing said chosen selection.

2. The method of claim 1 further comprising the step Of:

maintaining said track access mode for a second predetermined time after initiating reproduction of said chosen selection; and reverting to said volume adjust mode in response to an absence of rotation of said rotary position encoder lasting for said second predetermined time.

3. The method of claim 2 further comprising the steps of:

reverting to said volume adjust mode in response to an activation of said one of said push button controls during prior to said first predetermined time or prior to said second predetermined time; and reproducing said interim selection if not already being reproduced.

4. The method of claim 1 further comprising the step of:

flashing a predetermined icon in said display during said track access mode.

5. The method of claim 1 wherein said multimedia player reproduces said selections from a predetermined media, wherein said selections are stored on said media in a plurality of numbered directories, and wherein said recurrent advancing of interim selection numbers moves to a first selection in a next succeeding directory after a last selection in a directory is reached.

6. The method of claim 5 wherein said recurrent rollback of interim selection numbers moves to a last selection in a next preceding directory after a first selection in a directory is reached.

7. The method of claim 1 wherein said multimedia player reproduces said selections from a predetermined media, wherein said selections are stored on said media in a plurality of numbered directories, and wherein said playlist is comprised of substantially all selections on said media without reference to said numbered directories.

8. The method of claim 1 wherein said recurrent advancing or rolling-back of said interim selection numbers wraps between a first selection number and a last selection number in said ordered playlist.

9. The method of claim 1 wherein said current selection continues to be reproduced during said recurrent advancing or rolling-back of said interim selection.

10. A media player for reproducing selections from a storage media containing an ordered playlist of selections, each selection in said ordered playlist having a corresponding selection number, said media player having manual navigation from a current selection to a desired selection within said playlist, said media player comprising:

a display for displaying selection numbers;

a rotary position encoder generating rotation signals when manually rotated through a predetermined angular resolution in either a clockwise or a counterclockwise direction;

an audio circuit for providing selectable gain of said reproduction in response to said rotation signals when said rotary position encoder is in a volume adjust mode;

a user control push button for initiating a track access mode of said rotary position encoder; and a controller responsive to said rotation signals for displaying respective selection numbers for interim selections on said display, wherein said interim selection is recurrently advanced in response to successive rotation in said clockwise direction and is recurrently rolled back in response to said rotation in said counterclockwise direction, for detecting an absence of rotation of said rotary position encoder lasting for a first predetermined time, and for reproducing as a new current selection an interim selection having its selection number displayed after said first predetermined time.

11. The media player of claim 10 wherein said display includes a text display for displaying a mode change message when said track access mode is selected.

12. The media player of claim 11 wherein said mode change message is replaced by said interim selection numbers during said recurrent advancing or rolling-back of said interim selection numbers.

13. The media player of claim 10 wherein said display includes an icon that is flashingly illuminated during said track access mode.

14. The media player of claim 10 wherein said selections are stored on said storage media in a plurality of numbered directories, and wherein said recurrent advancing of interim selection numbers moves to a first selection in a next succeeding directory after a last selection in a directory is reached.

15. The media player of claim 14 wherein said recurrent rollback of interim selection numbers moves to a last selection in a next preceding directory after a first selection in a directory is reached.

16. The media player of claim 10 wherein said storage media is a CD-ROM disc, said media player further comprising a CD mechanism.

17. The media player of claim 10 wherein said selections are encoded in MP3 format, said media player further comprising a decoder coupled between said storage media and said audio circuit.

* * * * *